W. A. SCHLEICHER.
SWIVEL SNAP HOOK.
APPLICATION FILED OCT. 7, 1907.

940,738.

Patented Nov. 23, 1909.

WITNESSES
R A Balderson
W. W. Swartz

INVENTOR
Wm A. Schleicher
by Bakewell, Byrnes & Parmelee,
his Attys.

UNITED STATES PATENT OFFICE.

WILLIAM A. SCHLEICHER, OF CLEVELAND, OHIO.

SWIVEL SNAP-HOOK.

940,738. Specification of Letters Patent. Patented Nov. 23, 1909.

Application filed October 7, 1907. Serial No. 396,131.

*To all whom it may concern:*

Be it known that I, WILLIAM A. SCHLEICHER, of Cleveland, Cuyahoga county, Ohio, have invented a new and useful Swivel Snap-Hook, of which the following is a full, clear, and exact description, reference being had to the accompanying drawings, forming part of this specification, in which—

Figure 1:
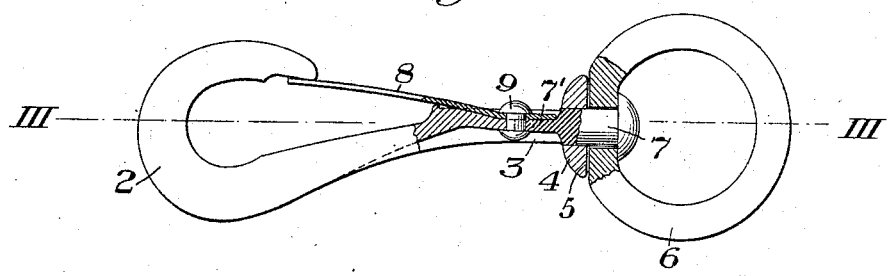
Figure 2:
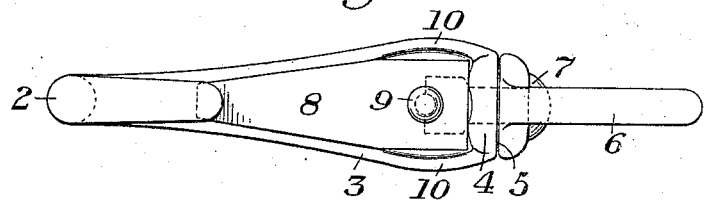
Figure 3:
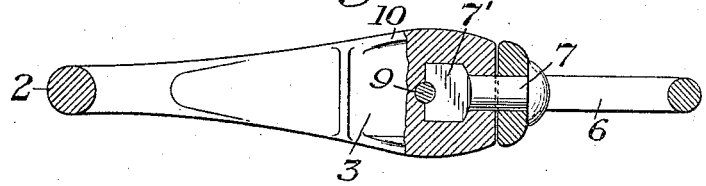

Figure 1 is a side view partly in section of a snap hook embodying my invention; Fig. 2 is a plan view of the same and Fig. 3 is a section on the line III—III of Fig. 1.

My invention has relation to what is generally known as swivel snap hooks, and is designed to provide a snap hook of this character which can be readily manufactured at a relatively small cost.

My invention relates more particularly to the manner of providing for the swivel connection between the hook proper and its attached ring or loop, and to the manner of seating and securing the tongue of the hook.

Referring to the accompanying drawings, the numeral 2 designates the hook proper, whose shank portion 3 is widened out toward its rear end, and is flattened on its top and bottom sides as shown. The shank terminates in the approximately circular head or button 4, having an approximately flat face 5 which bears against the correspondingly flattened face of the loop or ring 6.

7 is a headed stud which forms the swivel connection between the ring or loop and the shank of the hook. To receive this stud, the shank is provided with an aperture extending through the head or button 4, the shank being flattened sufficiently on the top and bottom to expose this aperture. The tongue or stud is inserted therein, and is secured by swaging or flattening its end, as shown at 7', access being had thereto for this purpose by the flattening of the shank so that the top and bottom of the end of the stud are exposed to the action of the tool. The flattening on the top of the shank also provides a seat for the end of the spring tongue 8, which is secured thereto, preferably by a rivet 9. The edges of the flattened seat for the end of this spring may be slightly flanged, as indicated at 10.

The manner in which the swivel connection is formed, enables the hook to be very cheaply and rapidly constructed, since the ring or loop can be applied to the swivel stud and the latter then inserted into the aperture in the shank of the hook and its exposed inner end swaged or flattened to firmly secure it in place. The spring tongue can then be secured to its seat and the article is completed. This is not only an extremely simple and inexpensive way of securing the swivel stud, but it also makes a strong and secure construction, since it is impossible for the stud to pull out in use.

I do not limit myself to the exact shape and construction of the parts which I have shown and described, since various changes may be made in the details thereof without departing from my invention as defined in the appended claims.

What I claim is:—

1. A hook having the rear end of its shank provided with a longitudinal socket having a lateral enlargement opening through a side of the shank, a loop, and a headed stud loosely piercing the loop and lying within the socket with a portion snugly fitting the enlargement thereof, substantially as described.

2. A hook having the rear end of its shank provided with a longitudinal socket having a lateral enlargement opening through opposite sides of the shank, a loop, and a headed stud loosely piercing the loop and lying within the socket with a portion snugly fitting the enlargement thereof, substantially as described.

3. A hook having the rear end of its shank provided with a longitudinal socket having an enlargement opening laterally through the shank at the hook side thereof, a loop, a headed stud loosely piercing the loop and entering the socket with a portion snugly fitting the enlargement thereof, a spring tongue lying across the lateral opening of the socket, and a fastening piercing the shank, the stud and the spring tongue, substantially as described.

4. A snap hook having the rear end of its shank terminating in a head provided with a flat rear face, the shank portion adjacent and in front of the head being flattened, there being a longitudinal socket extending through the rear end of the shank and having an enlargement in the flattened portion of the shank and opening laterally therethrough, a loop having a flat side, a headed stud loosely piercing the flat side of the loop and entering the socket with a portion snugly fitting the enlargement of the socket, a spring tongue covering the lateral opening of the socket, and a fastening piercing the tongue, the shank and the stud, substantially as described.

In testimony whereof, I have hereunto set my hand.

WILLIAM A. SCHLEICHER.

Witnesses:
ALFRED J. VATERS,
JOHN McGRATH.